(12) United States Patent
Lu

(10) Patent No.: US 11,385,253 B2
(45) Date of Patent: Jul. 12, 2022

(54) TRIAXIAL ACCELEROMETER MOUNTING ADAPTER

(71) Applicant: Baker Hughes Oilfield Operations LLC, Houston, TX (US)

(72) Inventor: Dan Tho Lu, Minden, NV (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 59 days.

(21) Appl. No.: 16/867,670

(22) Filed: May 6, 2020

(65) Prior Publication Data

US 2020/0371127 A1 Nov. 26, 2020

Related U.S. Application Data

(60) Provisional application No. 62/851,748, filed on May 23, 2019.

(51) Int. Cl.
*G01P 1/02* (2006.01)
*G01P 15/18* (2013.01)

(52) U.S. Cl.
CPC .............. *G01P 1/023* (2013.01); *G01P 15/18* (2013.01)

(58) Field of Classification Search
CPC ................................. G01P 1/023; G01P 15/18
See application file for complete search history.

(56) References Cited

U.S. PATENT DOCUMENTS

| 4,823,602 A * | 4/1989 | Christensen, Jr. | ..... G01H 11/06 73/661 |
| 2017/0248451 A1* | 8/2017 | Ginet | ..................... G01D 11/30 |

* cited by examiner

*Primary Examiner* — Walter L Lindsay, Jr.
*Assistant Examiner* — Andrew V Do
(74) *Attorney, Agent, or Firm* — Mintz Levin Cohn Ferris Glovsky and Popeo, PC; Lisa Adams

(57) ABSTRACT

Systems, methods, and devices are provided for aligning a reference axis of an accelerometer with a measurement axis of a machinery component. An adaptor including a mounting plate, a plate stud integrated within the mounting plate, and a screw can be coupled to an accelerometer to ensure proper alignment of the reference axis of the accelerometer with the measurement axis of the machinery component. Aligning the reference axis and the measurement axis using the adaptor ensures that the axial orientation of the vibration data collected by the accelerometer properly corresponds to the intended axis of measurement of the machinery component and thus allows for consistent, repeatable installations of the accelerometer onto the machinery component without introducing alignment errors which can generate erroneous vibration data with respect to one or more axes of measurement.

18 Claims, 7 Drawing Sheets

TRIAXIAL ACCELEROMETER MOUNTING ADAPTER

RELATED APPLICATION

This application claims priority under 35 U.S.C. § 119(e) to U.S. Provisional Application No. 62/851,748 filed May 23, 2019, the entire contents of which are hereby expressly incorporated by reference herein.

BACKGROUND

Accelerometers can be used to monitor vibration that may be occurring with respect to a component of machinery. Triaxial accelerometers can be configured to measure vibration data in three orthogonal directions, often described as the X-axis, Y-axis, and Z-axis. In order to accurately measure vibration data along a desired axis of the machinery component, a reference axis of the accelerometer must be aligned with a corresponding measurement axis of the machinery component so that the vibration data received by accelerometer properly reflects vibration occurring along the desired axis of the machinery component.

SUMMARY

In general, devices, system, and methods are provided for aligning a triaxial accelerometer with respect to a machinery component.

In one aspect, an adaptor is provided. In one embodiment, the adaptor can include a mounting plate configured to couple an accelerometer to a machinery component. The mounting plate can include a first surface and a second surface. The second surface can be opposite the first surface. The adaptor can also include a plate stud integrated with the mounting plate at the second surface. The adaptor can include a screw. The screw can include a screw head. The screw can be configured to couple the accelerometer to the mounting plate such that a reference axis indicator of the accelerometer is aligned with a measurement axis indicator applied to the mounting plate.

In another aspect, a system is provided. In one embodiment, the system can include an adaptor. The adaptor can be configured to couple an accelerometer to a machinery component. The adaptor can include a mounting plate. The mounting plate can include a first surface and a second surface. The second surface can be opposite the first surface. The mounting plate can also include a plate stud integrated within the mounting plate at the second surface. The adaptor can include a screw. The screw can include a screw head. The system can also include an accelerometer coupled to the mounting plate via the screw such that a reference axis indicator of the accelerometer is aligned with a measurement axis indicator applied to the mounting plate. The accelerometer can be configured to measure vibration data associated with a machinery component.

In another aspect, a method for aligning a triaxial accelerometer with respect to a machinery component is provided. In one embodiment, the method can include positioning an adaptor with respect to a machine. The adaptor can include a mounting plate and a screw. The method can also include securing the adaptor with respect to the machine. The method can further include determining a measurement axis of a machinery component of the machine. The method can include applying an indicator of the measurement axis on the mounting plate. The method can also include removing the adaptor from the machine. The method can further include coupling an accelerometer to the adaptor so as to align a reference axis indicator of the accelerometer with the measurement axis indicator on the mounting plate. The method can include securing the adaptor, including the coupled accelerometer, with respect to the machine.

DESCRIPTION OF DRAWINGS

These and other features will be more readily understood from the following detailed description taken in conjunction with the accompanying drawings, in which.

Figure 1:
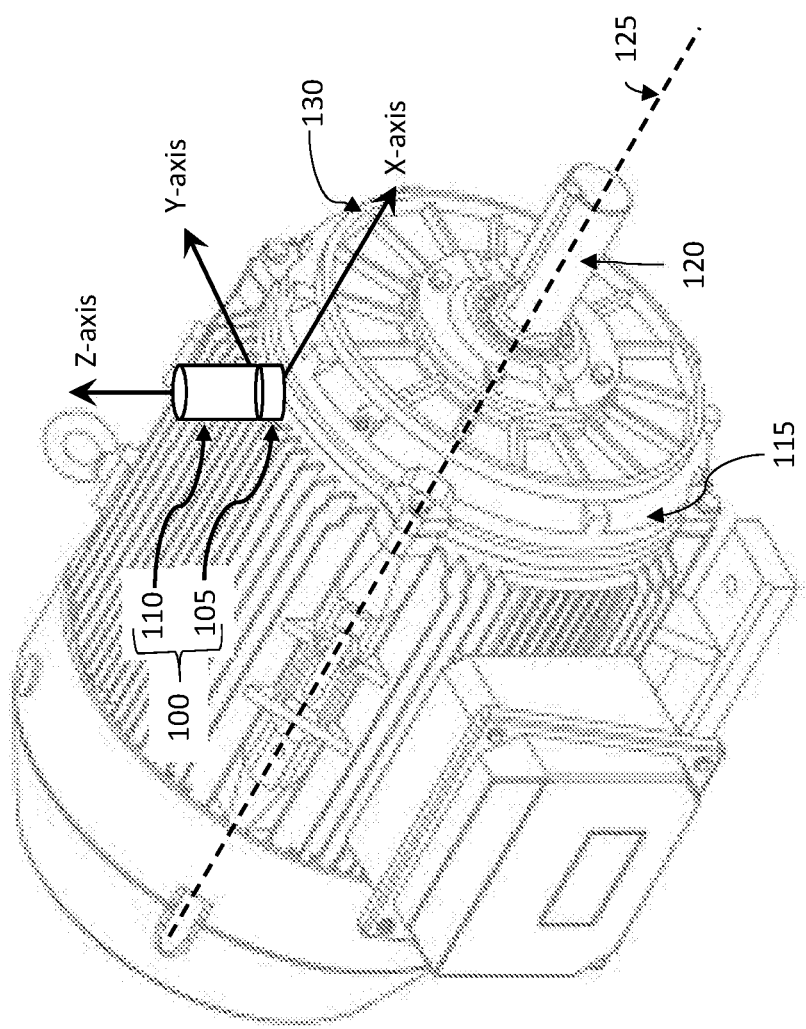
FIG. 1 is a diagram illustrating an exemplary embodiment of a system for aligning an accelerometer with respect to a machinery component.

It is noted that the drawings are not necessarily to scale. The drawings are intended to depict only typical aspects of the subject matter disclosed herein, and therefore should not be considered as limiting the scope of the disclosure.

DETAILED DESCRIPTION

Accelerometers, such as triaxial accelerometers, can be mounted to a machinery component to monitor for vibration generated by the machinery component during operation. Triaxial accelerometers can measure vibration data in three orthogonal Cartesian coordinate planes, represented as X, Y, and Z-axes. In order to collect accurate vibration data with respect to any one of these axes, it is important to align a reference axis of the accelerometer with a corresponding axis of the machinery component. For example, to measure vibration data associated with a horizontally-oriented shaft within a compressor or engine, the reference axis of the accelerometer must be aligned with the axis around which the shaft is rotating. Since the shaft is horizontally oriented, it can be determined that the shaft is rotating about the X-axis and thus the measurement axis of the shaft can be determined to be the X-axis. Once the measurement axis has been determined, the accuracy of the collected vibration data will depend on the proper alignment of the reference axis of the accelerometer with the measurement axis of the machinery component.

Properly aligning the reference axis of the accelerometer with the measurement axis of the machinery component for which vibration data is to be collected can be difficult when the accelerometer is mounted to the machinery component via a single mounting stud because the accelerometer may rotate around the stud causing the reference axis of the accelerometer to become unaligned from the measurement axis of the machinery component. This can be problematic when repeatedly installing and removing accelerometers from the machinery component. Another contributing factor to misalignment between the reference axis of the accelerometer and the measurement axis of the machinery component can be a misalignment between the start of the thread patterns on the mounting stud and the start of the thread patterns within the screw hole of an attachment element or bracket which may be used to mount the accelerometer to the machinery component. The thread patterns of on the mounting stud and the screw hole are not controllable and are not synchronized because they are manufactured by different vendors. As a result, when the accelerometer is tightened to the mounting stud with the required amount of torque, the reference axis of the accelerometer and the measurement axis of the machinery component may not be aligned.

An improved alignment system can be configured to provide consistent, repeatable alignment between a reference axis of an accelerometer and a measurement axis of a machinery component. The improved alignment system allows a reference axis indicator of the accelerometer to be aligned with a measurement axis indicator applied to the mounting plate. As compared to other alignment systems, the improved alignment system includes a small number of parts offering simple installation and requires no modifications to the accelerometer for installation making single or repeated installations simpler and less prone to installation errors, which can cause vibration data to be inaccurately reported and analyzed. The design of the system provides a low-profile adaptor that enables vibration data to be acquired from machinery components operating at higher frequencies, thus providing more robust performance as compared to other alignment systems.

An improved alignment system is provided herein including systems, devices, and methods for aligning a reference axis of an accelerometer with a measurement axis of a machinery component. The alignment system can include an adaptor configured to couple an accelerometer to a machinery component. The adaptor can include a mounting plate and a plate stud integrated within the mounting plate to receive a screw to couple the accelerometer to the mounting plate. The mounting plate can be installed with respect to a machinery component being monitored for vibration data and a determination of the desired measurement axis of the machinery component can be made. Based on determining the orientation of the measurement axis of the machinery component, an indicator can be applied to the mounting plate denoting the orientation or position of the measurement axis on the mounting plate. Once applied, the indicator of the measurement axis can be used to align an indicator of the reference axis that is indicated on the accelerometer with the indicator of the measurement axis that has been applied to the mounting plate. The screw can then be inserted through the integrated plate stud and into the accelerometer. As the screw is tightened, the alignment of the measurement axis of machinery component (as indicated by the indicator applied to the mounting plate) can be maintained with respect to the reference axis of the accelerometer (as indicated by the reference axis indicator on the accelerometer). The accelerometer, now coupled to the mounting plate, can be installed with respect to the machinery component thereby securing the accelerometer in a proper alignment with respect to the machinery component being monitored for vibration data.

Embodiments of systems, devices, and methods for aligning an accelerometer with a machinery component are discussed herein. However, embodiments of the disclosure can be employed for aligning other monitoring devices or sensors to a broad variety of machinery or machinery components without limit.

FIG. 1 is a diagram illustrating an exemplary embodiment of a system 100 for aligning an accelerometer with respect to a machinery component. As shown in FIG. 1, an alignment system 100 can be attached to a piece of machinery 115, such as a motor. The machinery 115 includes a machinery component 120, such as a rotating shaft for which vibration data is to be collected. The alignment system 100 includes an adaptor 105 and an accelerometer 110. The accelerometer 110 can include a single-axis accelerometer, a dual-axis accelerometer, a triaxial accelerometer, a velocity vibration transducer, or a displacement vibration transducer, or the like.

The adaptor 105 can be configured to couple the accelerometer 110 to the machine 115. In some embodiments, the adaptor 105 can be coupled to the machinery 115 directly via an attachment element. In the case of a triaxial accelerometer, the accelerometer 110 can be configured to collect and generate vibration data in any of three individual axes, such as the X, Y, and Z-axes. The machinery component 120 can be operating or otherwise moving with respect to one particular axis.

As shown in FIG. 1, the motor 115 includes a rotating shaft 120 which is rotating with respect to a horizontal axis, or the X-axis. The axis of the machinery component 120 for which the vibration data is to be collected can be referred to as the measurement axis. As shown in FIG. 1, the measurement axis of the rotating shaft 120 is a horizontal or the X-axis 125. Thus the rotating shaft 120 has a measurement axis 125 that corresponds to a horizontal or X-axis. In order to accurately and efficiently collect the vibration data, it is useful to ensure that a measurement axis 125 of the machinery component 120 is aligned with a reference axis 130 of the triaxial accelerometer 110. In this way, the collected vibration data is accurate with respect to the measurement axis 125 for which it was collected. Properly aligning the reference axis 130 of the accelerometer 110 with the measurement axis 125 of the machinery component 120 can avoid the need for subsequent post-processing of the collected vibration data that may be required to correctly associate the axial orientation of the collected vibration data with the axial orientation of the machinery component generating the vibration data.

Figure 2:
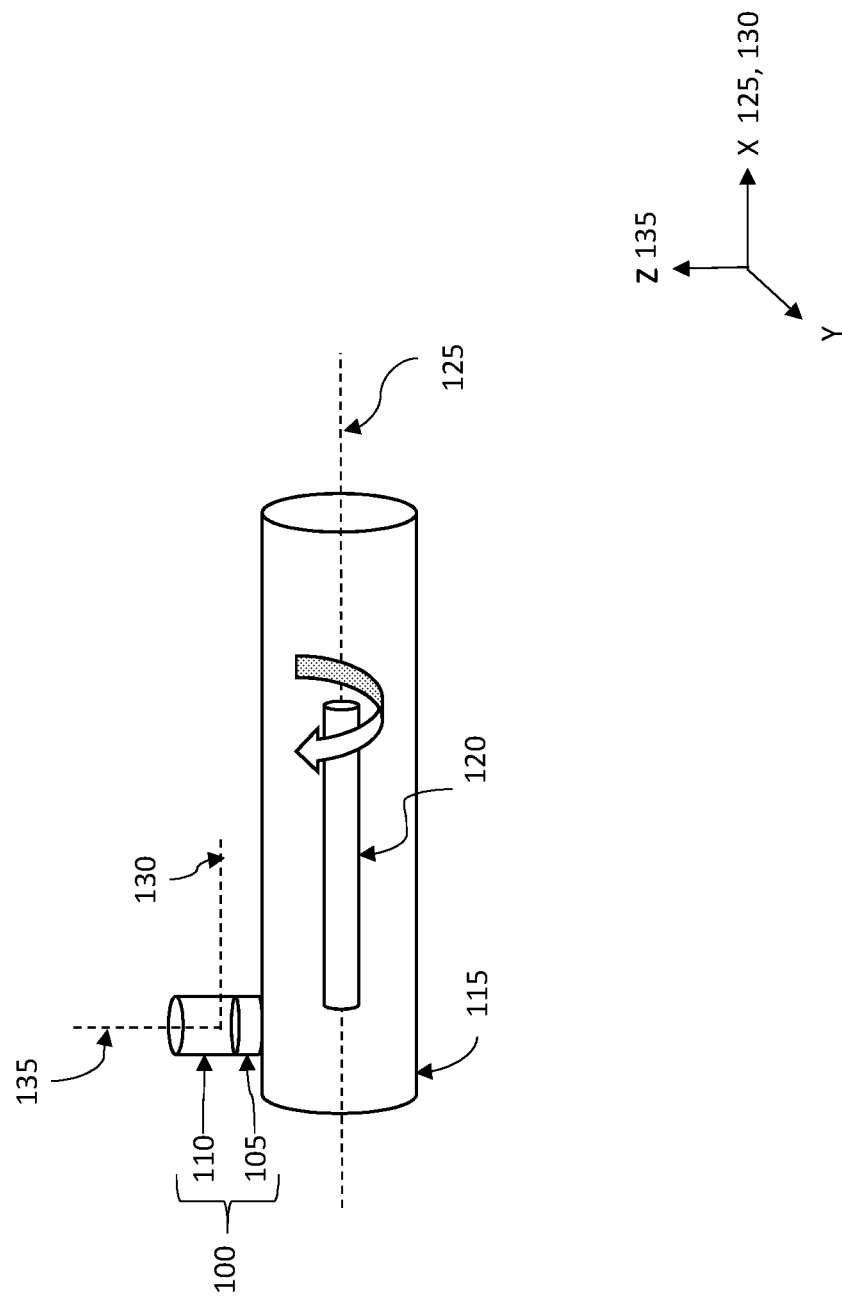
FIG. 2 is a diagram illustrating another exemplary embodiment of a system for aligning an accelerometer with respect to a machinery component.

FIG. 2 is a diagram illustrating another exemplary embodiment of a system 100 for aligning an accelerometer with respect to a machinery component. As shown in FIG. 2, the alignment system 100 includes an adaptor 105 and an accelerometer 110. The alignment system 100 is mounted to a machine 115. The alignment system is configured to monitor vibration data generated by a machinery component 120. Following the preceding example, the machinery 115 can be a motor and can include an operable component 120, such as a rotating shaft, for which vibration data is to be collected using the system 100. The component 120 can be rotating with respect to a measurement axis 125.

To aid discussion of the system 100, a reference axis indicator is provided in the lower right portion of the figure. The X-axis can be considered to be associated with a plane that traverses FIG. 2 horizontally, while the Y-axis can be considered to be associated with a plane extending into and out of the diagram shown in FIG. 2. The Z-axis can be considered to be associated with a plane that traverses FIG. 2 vertically.

As shown in FIG. 2, the measurement axis 125 of the machinery component 125 corresponds to the X-axis. The accelerometer 110 can include one or more reference axes, such as a reference axis oriented with respect to the X-axis. The reference axis 130 should be aligned with and oriented relative to the measurement axis 125 in order to collect accurate measurements of the vibration generated by the machinery component 120. As shown in FIG. 2, the system 100 has been installed to properly align the reference axis 130 of the accelerometer 110 with the measurement axis 125 that has been determined for the machinery component 120.

Figure 3:
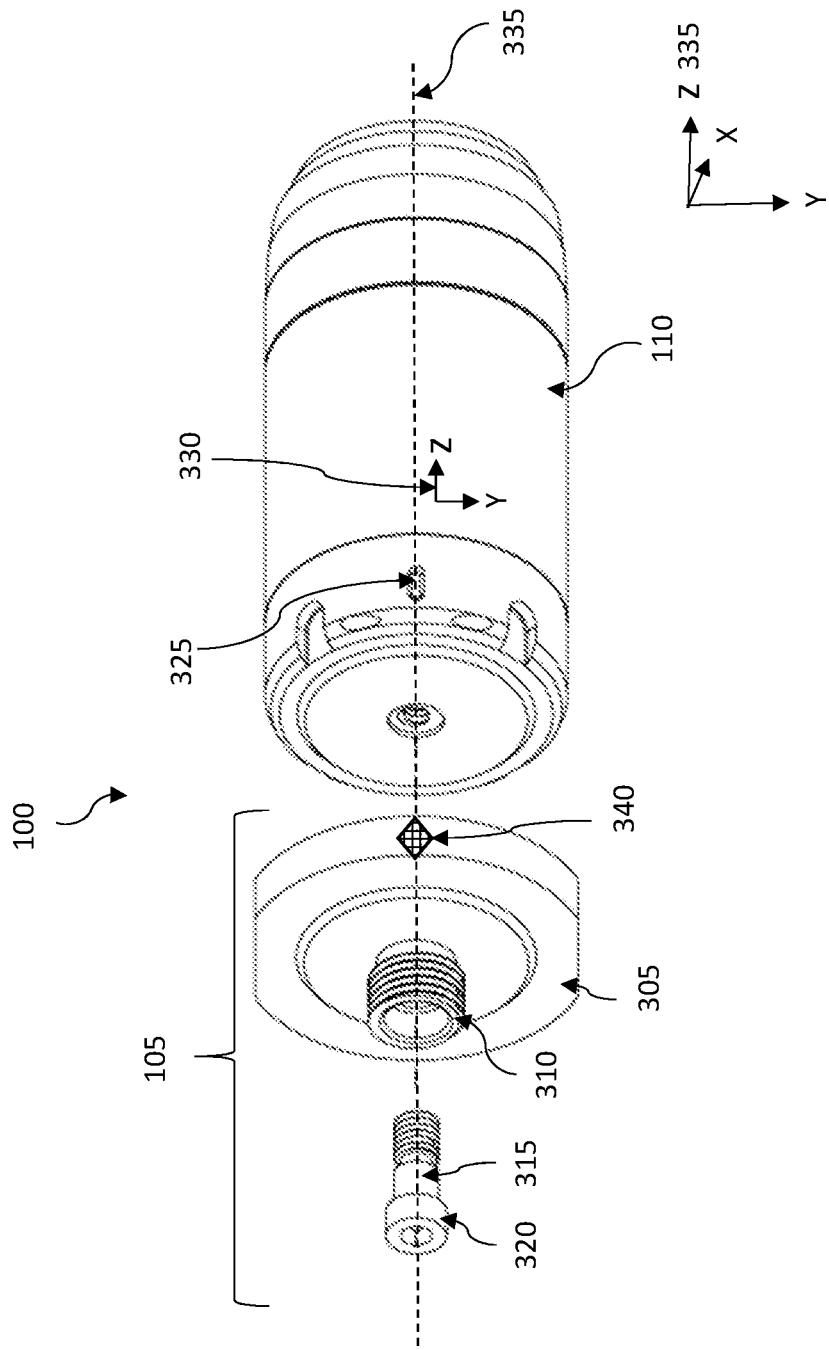
FIG. 3 is a diagram of an embodiment of the system of FIG. 2.

FIG. 3 is a diagram of an exemplary embodiment of the system 100 of FIG. 2. As shown in FIG. 3, the adaptor 105 can be coupled to the accelerometer 110.

To aid discussion of the system 100 shown in FIG. 3, a reference axis indicator is provided in the lower right portion of the figure. The X-axis can be considered to be associated with a plane extending into and out of the diagram shown in FIG. 3 orthogonally to the Z and Y-axes that traverse FIG. 3, while the Y-axis can be considered to be associated with a plane that traverses FIG. 3 vertically. The Z-axis can be considered to be associated with a plane that traverses FIG. 3 horizontally.

As shown in FIG. 3, the adaptor 105 includes a mounting plate 305 and a plate stud 310 that is integrated within the mounting plate 305. The mounting plate 305 can be configured to receive and couple to the accelerometer 110 and can be shaped as a circle as shown in FIG. 3. In some embodiments, the mounting plate 305 can be shaped as an oval, a rectangle, a square, a triangle, a polygon, or a parallelogram, or the like. In some embodiments, the shape and dimensionality of the mounting plate 305 can correspond to a shape and dimensionality of the accelerometer 110. The plate stud 310 can be a threaded stud extending away from the mounting plate 305. The outer surface of the plate stud 310 can be threaded in order to secure the adaptor 105 to the machinery 115 and/or to a machinery component 120. In some embodiments, outer diameter of the plate stud is ½" and can include a 20 threads per inch pitch pattern. In some embodiments, the outer diameter of the plate stud is ⅜" and can include a 24 threads per inch pitch pattern. In some embodiments, the plate stud 310 can include a smooth bore through which a screw 315 can pass in order to secure the accelerometer 110 to secure the accelerometer 110 to the adaptor 105. The accelerometer 110 is secured to the adaptor 105 by tightening the screw 315 such that the screw head 320 is seated against the end of the plate stud 310 opposite the accelerometer 110. In some embodiments, the screw 315 can be a metric screw with a nominal outer diameter of 4 mm or 6 mm, such as an "M4" or "M6" screw as designated by the International Organization for Standards (ISO).

As further shown in FIG. 3, the accelerometer 110 includes a reference axis indicator 325 and a reference axis indicator legend 330. The reference axis indicator 325 can be a mark or etching applied to the accelerometer 110 to indicate a particular, designated reference axis of the accelerometer 110. As shown in FIG. 3, based on the orientation of the Z and Y axes provided in the reference axis indicator legend 330, it can be determined that the reference axis indicator 325 indicates that the orientation of the reference axis corresponds to an X-axis reference axis, such as the X-axis reference axis 130 shown FIG. 2. In some embodiments, the reference axis indicator 325 can correspond to a Y-axis reference axis or a Z-axis reference axis. Having determined the orientation of the X-axis reference axis, the reference axis indicator legend 330 can assist in determining the orientation of the other reference axes of the accelerometer 110. As shown in FIG. 3, the Z-axis reference axis 335 can be further determined. The Y-axis reference axis would appropriately be oriented orthogonally to the X and Z axes. The reference axis indicator 325 can be used to align the adaptor 105 with the accelerometer 110 via a measurement axis indicator 340 applied to the adaptor 105. In this way, as shown in FIG. 2, the reference axis 130 of the accelerometer 110 is aligned with the measurement axis 125 of the machinery component 120.

Figure 4:
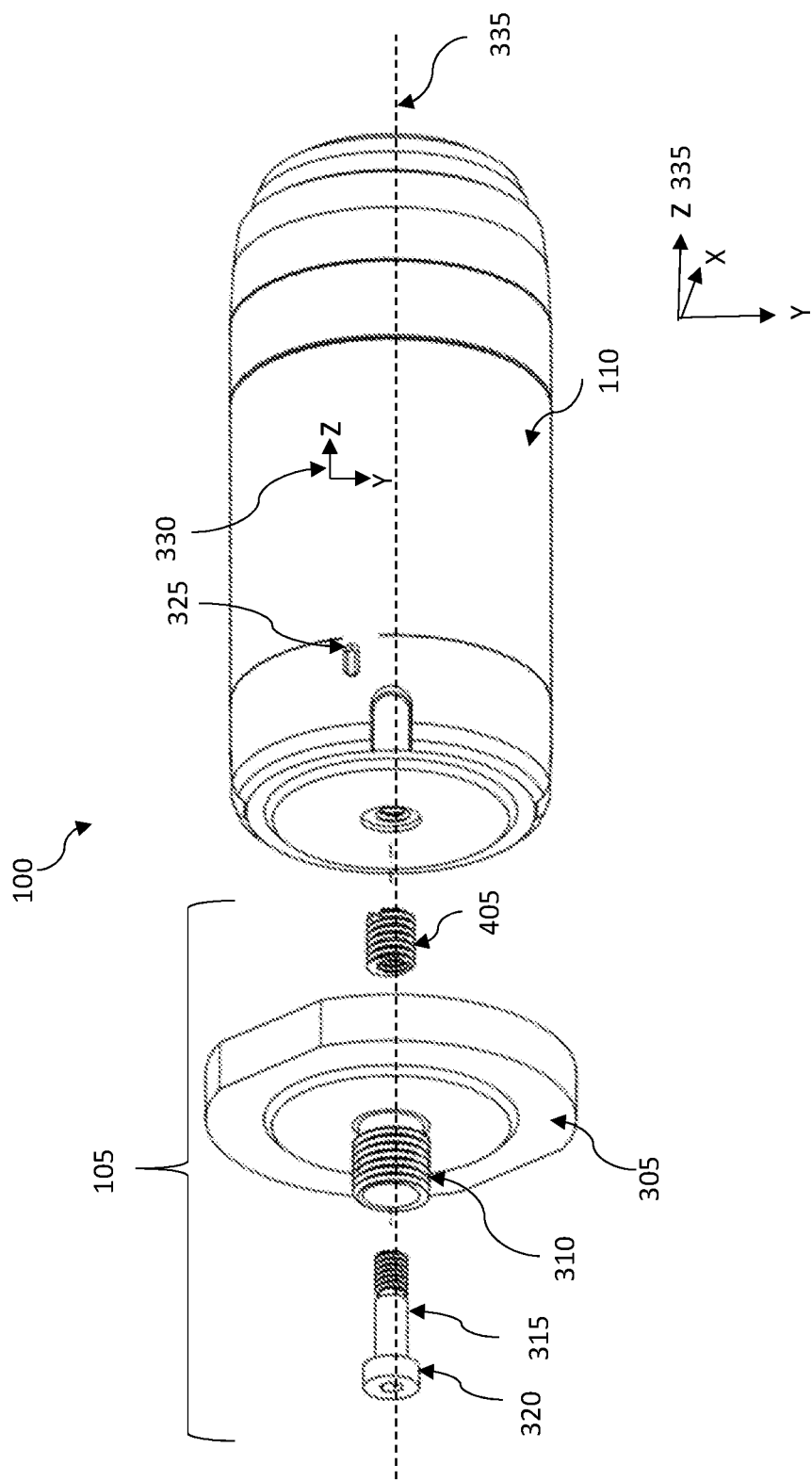
FIG. 4 is a diagram of another embodiment of the system of FIG. 2.

FIG. 4 is a diagram of another exemplary embodiment of the system 100 of FIGS. 2 and 3. As shown in FIG. 4, the adaptor 105 can further include a threaded coupling 405. The threaded coupling 405 can be used in embodiments when the plate stud 310 is configured as a ⅜"-24 sized stud and an M4 sized screw 315 is used. The threaded coupling 405 can include an inner thread pitch pattern that is associated with an M4 sized screw 315 and an outer thread pitch pattern that is associated with an M6 sized screw 315. In this way, the threaded coupling 405 can be used to receive an M4 sized screw 315 within the plate stud 310 so as to couple an accelerometer 110 configured to receive an M6 sized screw 315 to the mounting plate 305.

Figure 5A:
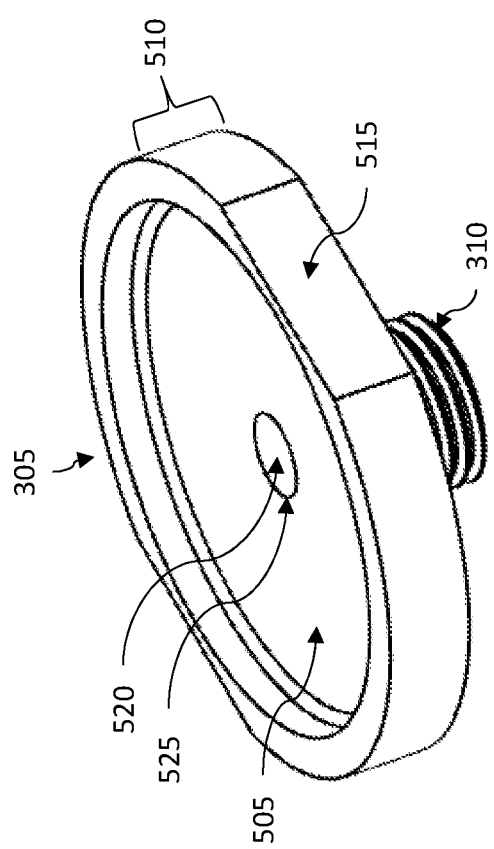
FIGS. 5A-5B are diagrams of a mounting plate included in the adaptor of FIGS. 2-4.
Figure 5B:
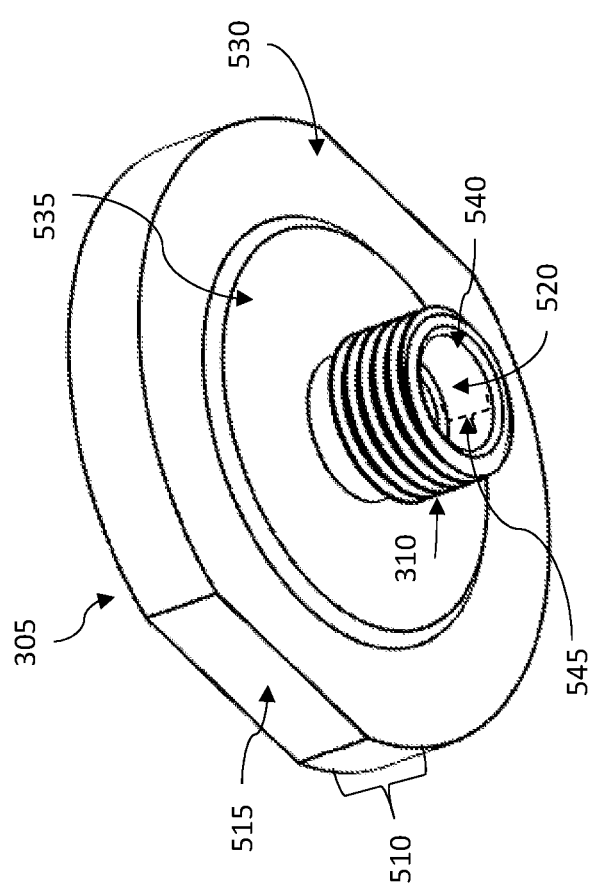

FIGS. 5A-5B are diagrams of a mounting plate 305 included in the adaptor 105 of FIGS. 2-4. FIG. 5A illustrates the mounting plate 305 from an angled, top-down perspective. FIG. 5B illustrates the mounting plate 305 from an angled, bottoms-up perspective.

As shown in FIG. 5A, the mounting plate 305 includes a first surface 505 that is within a recessed portion of the mounting plate 305 and is formed by a collar 510 extending vertically around the periphery of the mounting plate 305 and away from the first surface 505. The collar 510 can surround a portion of the accelerometer 110 when the adaptor 105 is coupled to the accelerometer 110 and may provide structural support to maintain the union of the adaptor 105 and the accelerometer 110 during high vibrational forces exerted on the system 100 by the machinery component 120 and/or the machine 115 of FIGS. 1-2. The collar 510 includes a plurality of vertical surfaces 515 arranged around the periphery of the mounting plate 305. The vertical surfaces 515 enable use of a tool for securing or removing the adaptor 105 from the attachment element, as well as to secure the adaptor 105 during coupling or removal from the accelerometer 110. In some embodiments there may be 2, 3, 4, 5, or 6 vertical surfaces 515. In some embodiments, the number, shape, and arrangement of the vertical surfaces 515 can depend on the shape of the mounting plate 305 and/or the collar 510.

As further shown in FIG. 5A, the mounting plate 305 includes a plate stud 310 which is configured with a bore 520 extending therethrough. The bore 520 includes a first opening 525 in the first surface 505. The first opening 525 allows the screw 315 to pass through the bore 520 and into a threaded portion at the base of the accelerometer 110 in order to secure the accelerometer 110 to the adaptor 105.

As shown in FIG. 5B, the mounting plate 305 includes a second surface 530 located opposite the first surface 505. The plate stud 310 is integrated with the mounting plate 305 at the second surface 530. In some embodiments, the second surface 530 is a flat surface. In other embodiments, the second surface 530 can include a raised or elevated portion 535 which may correspond to the overall shape of the mounting plate 305. In some embodiments, the raised or elevation portion 535 may not correspond to the overall shape of the mounting plate 305. The bore 520 of the plate stud 310 includes a second opening 540. The second opening 540 allows the screw 315 to be received into the bore 520 for securing the accelerometer 110 to the adaptor 105. In some embodiments the second opening 540 can include a recession 545 allowing the screw head 320 to be positioned or recessed within the plate stud 310.

Figure 6:
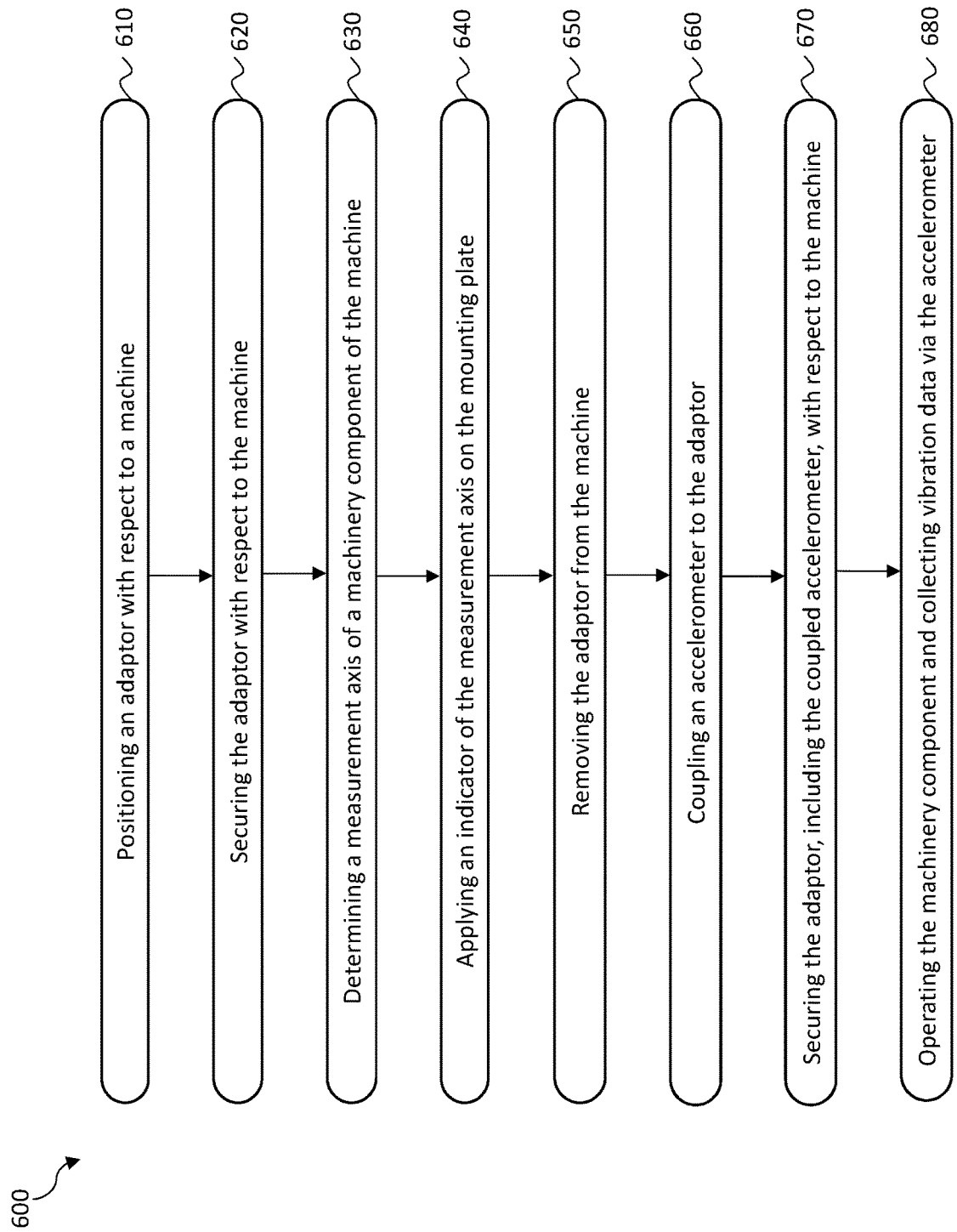
FIG. 6 is a flowchart illustrating one exemplary embodiment of a method for aligning an accelerometer to a machinery component using the system of FIGS. 2-3.

FIG. 6 is a flowchart illustrating one exemplary embodiment of a method for aligning a triaxial accelerometer to a machinery component using the system 100 of FIGS. 2-3 and the mounting plate 305 as shown in FIGS. 4, and 5A-5B.

In operation 610, the adaptor 105 is positioned with respect to a machine 115 comprising a machinery component 120. The adaptor 105, excluding the screw 315, can be positioned with respect to the machine 115 by inserting the plate stud 310 of the adaptor 105 into a hole or other receiving mechanism configured within the machine 115. In some embodiments, the adaptor 105 can be positioned within the machinery 115 with respect to the machinery component 120.

In operation 620, the adaptor 105 is secured with respect to the machine 115. The plate stud 310 may be inserted into a receiving mechanism configured with respect to the machine, such as a threaded bore. In this example, the adaptor 105 can be secured to the machine 115 by screwing the plate stud 310 into the receiving mechanism and applying a predetermined or specified amount of torque to the mounting plate to secure the adaptor 105 within the receiving mechanism of the machine 115.

In operation 630, a measurement axis 125 of the machinery component 120 is determined. Based on the configuration and orientation of the machine 115 and/or the machinery component 120, the measurement axis 125 of the machinery component 120 for which vibration data is to be collected can be determined. A machinery component 120 oriented horizontally can be determined to have a measurement axis corresponding to an X-axis. A machinery component 120 that is oriented vertically can be determined to have a measurement axis corresponding to a Y-axis. A machinery component 120 that is oriented orthogonally to X and Y-axes can be determined to have a measurement axis corresponding to a Z-axis.

In operation 640, an indicator of the measurement axis 125 is applied on the mounting plate 305. The indicator will indicate the orientation of the measurement axis 125 on the mounting plate 305. In some embodiments, the indicator can be applied using a marker pen. In some embodiments, the indicator can be applied using a sharp object to etch a mark or indicator mark into the mounting plate 305. In some embodiments, the indicator can be a sticker that can be applied to the mounting plate 305 to denote the orientation of the measurement axis 125.

In operation 650, the adaptor 105 is removed from the machine. Having applied the indicator of the measurement axis 125 to the mounting plate 305, the orientation of the measurement axis 125 is now defined relative to the mounting plate 305. The indicator can then serve as an alignment aid when coupling the accelerometer 110 to the adaptor 105. The adaptor 105 can be removed from the machine 115 by unscrewing the plate stud 310 from the receiving mechanism of the machine 115 or by otherwise decoupling the adaptor 105 from the machine.

In operation 660, an accelerometer 110 is coupled to the adaptor 105. The accelerometer 110 can be coupled to the adaptor 105 by inserting a screw 315 through the second opening 535 of the plate stud 310 into the bore 520 such that the screw 315 can further pass through the first opening 525 and into the accelerometer 110. While the accelerometer 110 is being coupled to the adaptor 105, the reference axis indicator 325 of the accelerometer 110 can be maintained in alignment the measurement axis indicator 340 applied to the mounting plate 305 during operation 640. In this way, as the screw 315 is tightened to couple the accelerometer 110 to the adaptor 105, alignment between the reference axis indicator 325 and the measurement axis indicator 340 on the mounting plate 305 can be achieved to ensure the reference axis of the accelerometer 110 is properly aligned with the measurement axis 125 of the machinery component 120.

In operation 670, the adaptor 105, including the coupled accelerometer, is secured with respect to the machine 115. Operation 670 is performed in a similar manner as operation 620, however in operation 670, the adaptor 105 is now coupled to the accelerometer and ready for use in collecting and monitoring vibration data associated with the machinery component 120.

In operation 680, the machinery component 120 can be operated and vibration data can be collected via the accelerometer 110. The collected vibration data will now properly correlate to the appropriate measurement axis 125 because of the proper alignment with the reference axis indicator that can be achieved by the system 100 and specifically by the adaptor 105.

The improved alignment system described herein addresses the technical problem of ensuring alignment of a reference axis of an accelerometer with a measurement axis of a machinery component. The problem of properly aligning these two axes can be difficult, time-consuming, and prone to error often requiring multiple attempts and numbers re-installations of the accelerometer in order to determine the proper alignment. The exemplary technical effects of the methods, systems, and devices described herein include, by way of non-limiting example, providing an adaptor capable of enabling proper alignment of a reference axis of an accelerometer with a corresponding measurement axis of a machinery component for which vibration data is to be collected. By providing an adaptor configured to receive an indicator of a measurement axis of the machinery component to be monitored, and aligning that measurement axis indicator with the reference axis indicator of the accelerometer, the adaptor can achieve proper alignment between these two axes in an intuitive, easy to use manner, that produces consistent alignment during a single or repeated installations. The adaptor and system described herein reduces the estimation and trial and error previously required to determine such alignment and allows for maintaining the proper alignment over repeated re-installations of the accelerometer.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. An adaptor comprising:
   a mounting plate configured to couple an accelerometer to a machinery component, the mounting plate including a first surface and a second surface, the second surface opposite the first surface, and a plate stud integrated with the mounting plate at the second surface;
   a collar arranged with respect to a periphery of the mounting plate and extending vertically away from the first surface of the mounting plate at which the accelerometer is coupled to the mounting plate so as to surround a portion of the accelerometer; and
   a screw, including a screw head, the screw configured to couple the accelerometer to the mounting plate such that a reference axis indicator of the accelerometer is aligned with a measurement axis indicator applied to the mounting plate.

2. The adaptor of claim 1, wherein the mounting plate is shaped as a circle, an oval, a rectangle, a square, a triangle, a polygon, or a parallelogram.

3. The adaptor of claim 1, wherein the collar includes a plurality of vertical surfaces arranged around the periphery of the mounting plate.

4. The adaptor of claim 1, wherein the plate stud includes a first screw thread configuration corresponding to a first outer diameter of the plate stud or a second screw thread configuration corresponding a second outer diameter of the plate stud.

5. The adaptor of claim 1, wherein the plate stud extends away from the second surface of the mounting plate and includes a bore extending through the plate stud, the bore including a first opening in the first surface of the mounting plate and a second opening opposite the second surface of the mounting plate, the bore allowing the screw to pass through the plate stud and the mounting plate to couple the accelerometer to the mounting plate.

6. The adaptor of claim 5, wherein the second opening of the bore is configured to receive the screw head within a recess formed within the second opening of the bore or to receive the screw head such that the screw head is directly interfaced with the second opening of the plate stud.

7. A system comprising:
   an adaptor configured to couple an accelerometer to a machinery component, the adaptor including,
      a mounting plate including a first surface and a second surface, the second surface opposite the first surface, and a plate stud integrated with the mounting plate at the second surface;
      a collar arranged with respect to a periphery of the mounting plate and extending vertically away from the first surface of the mounting plate at which the accelerometer is coupled to the mounting plate so as to surround a portion of the accelerometer; and
      a screw, including a screw head; and
      an accelerometer coupled to the mounting plate via the screw such that a reference axis indicator of the accelerometer is aligned with a measurement axis indicator applied to the mounting plate, the accelerometer configured to measure vibration data associated with a machinery component.

8. The system of claim 7, wherein the mounting plate is shaped as a circle, an oval, a rectangle, a square, a triangle, a polygon, or a parallelogram.

9. The system of claim 7, wherein the collar includes a plurality of vertical surfaces arranged around the periphery of the mounting plate.

10. The system of claim 7, wherein the plate stud includes a first screw thread configuration corresponding to a first outer diameter of the plate stud or a second screw thread configuration corresponding a second outer diameter of the plate stud.

11. The system of claim 7, wherein the plate stud extends away from the second surface of the mounting plate and includes a bore extending through the plate stud, the bore including a first opening in the first surface of the mounting plate and a second opening opposite the second surface of the mounting plate, the bore allowing the screw to pass through the plate stud and the mounting plate to couple the accelerometer to the mounting plate.

12. The system of claim 11, wherein the second opening of the bore is configured to receive the screw head within a recess formed within the second opening of the bore or to receive the screw head such that the screw head is directly interfaced with the second opening of the plate stud.

13. A method comprising:
   positioning an adaptor with respect to a machine, the adaptor configured to couple an accelerometer to the machine, wherein the adaptor includes a mounting plate, a screw, and a collar arranged with respect to a periphery of the mounting plate and extending vertically away from the first surface of the mounting plate at which the accelerometer is coupled to the mounting plate so as to surround a portion of the accelerometer;
   securing the adaptor with respect to the machine;
   determining a measurement axis of a machinery component of the machine;
   applying an indicator of the measurement axis on the mounting plate;
   removing the adaptor from the machine;
   coupling the accelerometer to the adaptor so as to align a reference axis indicator of the accelerometer with the measurement axis indicator on the mounting plate; and
   securing the adaptor, including the coupled accelerometer, with respect to the machine.

14. The method of claim 13, wherein securing the adaptor with respect to the machine includes applying a predetermined amount of torque to the mounting plate.

15. The method of claim 13, wherein the accelerometer includes a single-axis accelerometer, a dual-axis accelerometer, a triaxial accelerometer, a velocity vibration transducer, or a displacement vibration transducer.

16. The method of claim 13, wherein applying a measurement axis indicator includes applying the measurement axis indicator on the mounting plate with a marker or sharp object, the measurement axis indicator corresponding to the determined measurement axis of the machinery component.

17. The method of claim 13, further comprising operating the machinery component and collecting vibration data via the accelerometer.

18. The method of claim 13, wherein the accelerometer is coupled within the adaptor by inserting the screw through a plate stud integrated with the mounting plate and tightening the screw in the accelerometer with a predetermine amount of torque.

\* \* \* \* \*